United States Patent
Moore

[15] 3,648,661
[45] Mar. 14, 1972

[54] BIRD FEEDER
[72] Inventor: Harrington Moore, Pine Island, Newbury, Mass. 01950
[22] Filed: Mar. 2, 1970
[21] Appl. No.: 15,521

[52] U.S. Cl. .............................................. 119/53
[51] Int. Cl. ........................................... A01k 05/00
[58] Field of Search ............................ 119/51, 52, 53

[56] References Cited

UNITED STATES PATENTS

| 2,866,435 | 12/1958 | Blazier | 119/53 |
| 2,593,879 | 4/1952 | Harry | 119/53 |
| 3,117,554 | 1/1964 | Taylor | 119/52 R |
| 2,660,150 | 11/1953 | Kalb | 119/53 |

Primary Examiner—Hugh R. Chamblee
Attorney—Morse, Altman & Oates

[57] ABSTRACT

A funnel-shaped bird feeder is provided with a pivoted hood for easy loading, a transparent chamber for viewing feed level, and a variable combination feeding tray and perch by which the feeder may be adjusted to accommodate birds of different sizes. The feeder also includes adjustable feed opening for controlling the rate of flow of bird feed in accordance with the size of seed in the feeder.

7 Claims, 7 Drawing Figures

Patented March 14, 1972
3,648,661
2 Sheets-Sheet 1
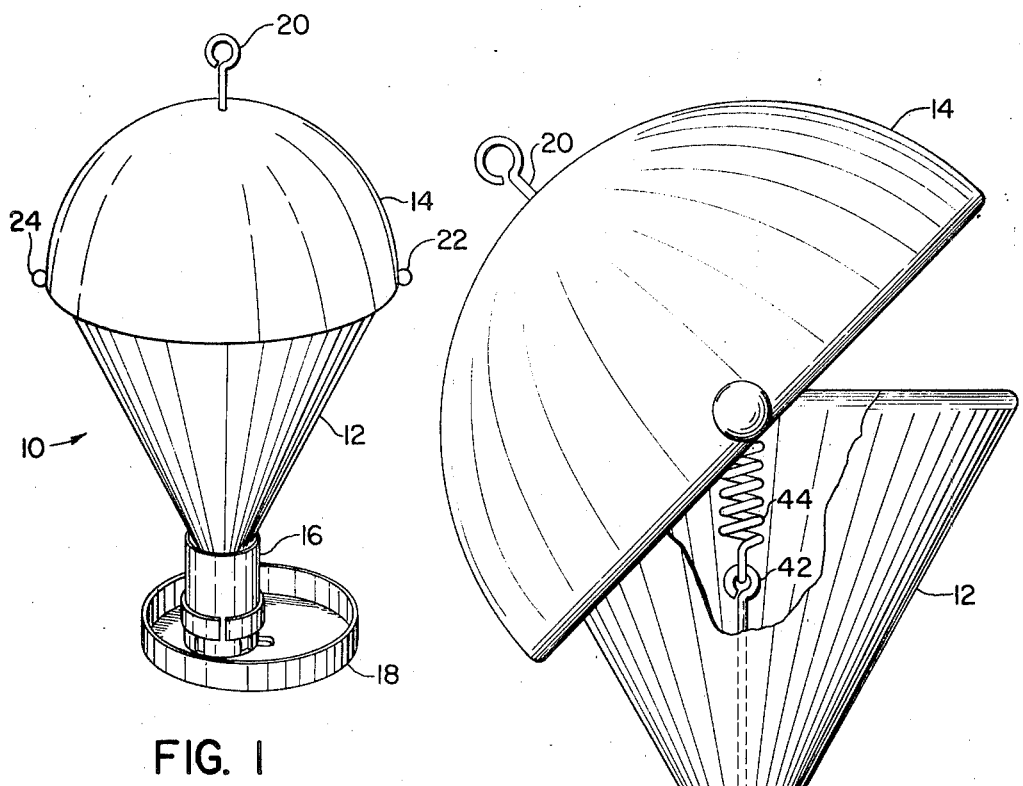
FIG. 1
FIG. 2
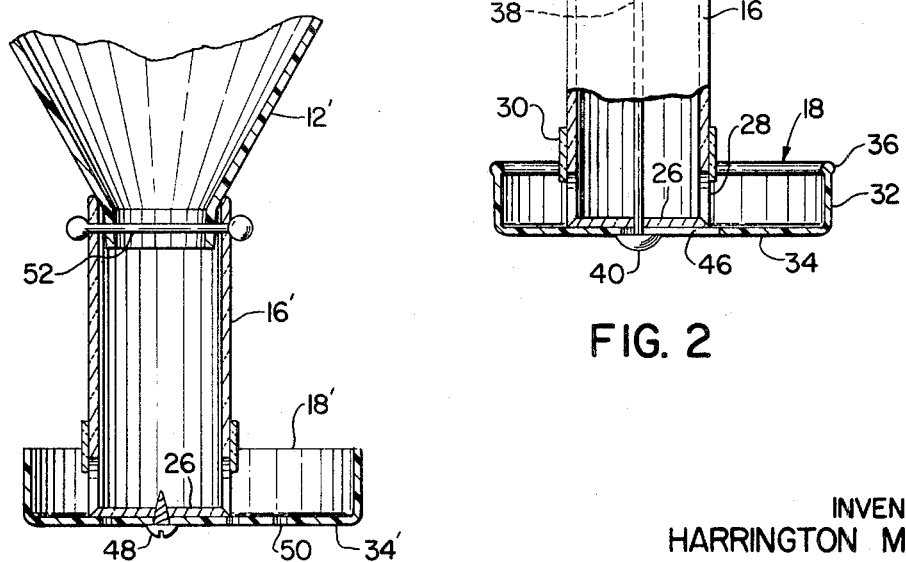
FIG. 3
INVENTOR
HARRINGTON MOORE
BY Morse, Altman & Oates
ATTORNEYS Patented March 14, 1972 3,648,661

INVENTOR
HARRINGTON MOORE

BY Morse, Altman + Oates

ATTORNEYS

BIRD FEEDER

BACKGROUND OF THE INVENTION

1. Field of the Invention

This invention generally relates to bird feeders and more particularly is directed towards a new and improved bird feeder designed for easy loading, for quick adjustment according to seed size and convenient adjustment according to the size of bird which may feed at the unit.

2. Description of the Prior Art

Bird feeders are available in a wide variety of styles, sizes and designs, ranging from some relatively simple devices to rather elaborate models. One of the problems which is characteristic of most bird feeders is that they are relatively difficult to fill with seed as the supply is depleted. in attempting to protect the seed from squirrels and the elements most feeders generally available involve lids, covers or other closures that are screwed in place over openings through which the feed must be poured and then resealed. Another drawback with existing feeders is that where it is desired to have one size of bird feed at one station and perhaps a larger size bird feed at another station, it has been necessary to supply different size bird feeders which are able to accommodate different size birds. Accordingly, it is a general object of the present invention to provide improvements in bird feeders. Another object of this invention is to provide a bird feeder that is easily re-fillable and one that is adjustable to accommodate different size birds. A further object of this invention is to provide a bird feeder which is squirrel proof and is adjustable to control the rate of seed flow in accordance with difference size seed being used.

SUMMARY OF THE INVENTION

This invention features a bird feeder comprised of a transparent funnel-shaped container having a cover pivotally connected over the open upper end of the funnel and by which the unit is suspended for easy opening and closing of the feeder for re-filling. An adjustable combination perch and feed tray closes the bottom of the funnel and is movable from a concentric to an eccentric position to accommodate different size birds. A further feature of this invention includes a slideable collar disposed about the neck of the funnel for opening and closing ports at the base of the funnel and thereby controlling the rate of seed flow onto the perch.

BRIEF DESCRIPTION OF THE DRAWINGS

FIG. 1 is a view in perspective of a bird feeder made according to the invention, FIG. 2 is a view in side elevation partly broken away, showing details of the invention, FIG. 3 is a fragmentary sectional view in side elevation showing details of the base portion in a modification of the invention.

DETAILED DESCRIPTION OF THE PREFERRED EMBODIMENTS

Figure 4:
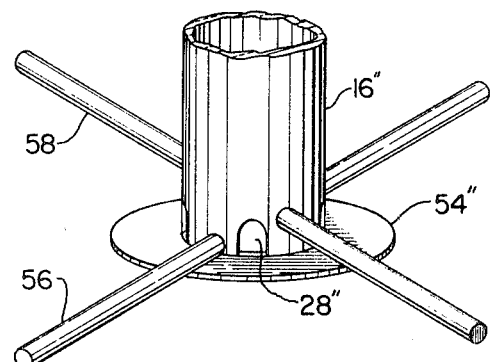
FIGS. 4, 5 and 6 are detailed perspective views showing modifications of the invention, and, FIG. 7 is a fragmentary perspective of a further modification of the invention.

Referring now to FIGS. 1 and 2 of the drawings the reference character 10 generally indicates a bird feeding station comprised of a funnel-shaped body portion 12 defining a chamber for storing bird seed therein, a domed lid or cover 14 hinged to the body portion 12, a tubular lower neck 16 and a combination perch and feeding tray secured to the bottom of the neck 16. The cover 14 is provided with a hook 20 or other hanging device by which the feeder may be suspended from a tree, post, or the like. The lid which may be molded from plastic, is smoothly rounded and overhangs the open top of the funnel body portion 12 not only to shield the open end of the funnel from the weather but also to prevent squirrels or other rodents from getting at their seed. It will be understood that the smooth character and rounded shape of the lid will prevent squirrels from gaining a footing on the feeder and will thus make it extremely difficult for a squirrel to get at birds feeding on the station or the seed contained therein.

In the preferred form of this invention, the lid 14 and body 12 are hinged to one another by means of a cross piece 22, typically a wooden dowel, extending diametrically across the upper portion of the body 12 and the lower portion of the lid 14 extending through the walls of both parts and fastened by means of nuts 24 or the like. By articulating the two parts as described, it is possible to tip the cover with respect to the body portion as suggested in FIG. 2 thereby making it extremely easy to fill the funnel-shaped body with seed the need arises. The feeder is closed simply by merely allowing the feeder to hang under its own weight straight from its hook since the normal condition of the feeder when suspended will be as shown in FIG. 1, the cover tilting back into its normally closed position.

Preferably, the neck 16 is made of a transparent material such as clear acrylic plastic or glass so that the feeder may be visually inspected from a distance to determine whether or not additional seed is required. The funnel-shaped body portion may also be transparent if desired and may be of one-piece with the tubular neck portion 16.

The bottom of the tubular neck 16 is closed by means of a wall 26 and formed with a plurality of openings or ports 28 about its lower end through which bird seed spills out by gravity onto the combination perch and tray 18. In order to control the rate of flow of the seeds onto the tray, an annular split collar 30 is mounted slideably over the neck 16 and is adapted to be manually raised or lowered along the neck so as to restrict the size of the discharge opening in accordance with the feed size. For example, if the feeder were filled with sunflower seeds, which are quite large, the collar 30 would be raised clear of the ports 28 for a maximum flow whereas with a smaller seed the collar may be pushed down to block off part of the ports 28 as required.

The combination tray and perch 18 is in the form of a shallow cup having surrounding annular upright side walls 32 disposed about a circular bottom wall 34. In practice, the upright wall 32 may terminate in a thickened rounded rib 36 on which birds may land and will provide a proper grip for the birds. Alternatively, an O-ring, rubber annulus, or the like may be fitted over the upper edge of the wall 32 to provide a more natural perch for the birds. The perch 18 is mounted to the feeder by means of elongated rod 38 extending centrally through the tube 16 and the body portion 12, the lower end being provided with a head 40 and the upper end being provided with a hook or eye 42 engaging a spring 44 which, in turn, engages the central portion of the cross piece 22. The wall 26 is formed with a center opening to accommodate the rod 38 while the perch wall 34 is formed with a slot 46 through which the rod extends. The function of the slot is to permit adjustment of the perch from a concentric to an eccentric position with respect to the tube 16. The spring-loaded rod, it will be understood, holds the parts together and the perch may be adjusted by pulling down slightly against the spring and pushing the perch to the desired position while restraining the remaining portion of the feeder. With the perch in a concentric position the feeder will be restricted primarily to small and medium size birds since the distance between the edge of the perch and the tube 16 will be uniform, too small for larger size birds to feed. If it is desired to permit larger size birds to feed at the same station as smaller size birds, the perch is moved into the eccentric position shown in FIGS. 1 and 2 so that a portion of the perch will be moved outwardly with respect to the tube 16 allowing more room for larger size birds to feed. Thus a single feeder may be adjusted to accommodate a variety of bird sizes.

Referring now to FIG. 3 of the drawings, there is illustrated a modification of the invention and in this embodiment a combination perch and feeding tray 18' is connected to a wall 26' by means of a screw 48. The perch has a bottom wall 34' formed with spaced apart openings 50 by which the perch may be adjusted in the manner described in the principal embodiment. Alternatively, the screw 48 may be secured eccentrically to the wall 26 so that the adjustment may be made by rotating the perch about the screw position. In the FIG. 3 embodiment, a tubular neck 16' is secured to a funnel-shaped body 12' a by means of a cross piece 52 extending through the walls of the tube 16' and the lower portion of the body 12'. Here again, the body 12' and tube 16' may be of one piece construction.

Figure 5:
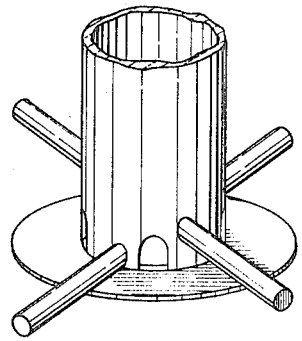

Referring now to FIGS. 4 and 5 of the drawings, there is illustrated a further modification of the invention and in this embodiment the combination perch and tray has been replaced by an enlarged disc 54 forming the bottom wall of a tubular neck 16'', the disc extending for some distance from the base of the neck to gather seed flowing from ports 28''. In this embodiment cross bars 56 and 58 extend through the tubular neck 16'' in the bottom thereof and in a horizontal plane to serve as perches for birds feeding in the station. The perches may be made long, as shown in FIG. 4, to accommodate large size birds or may be in short sizes as shown in FIG. 5 to limit the feeder to small size birds. The bird perches 56 and 58 are slideably mounted through openings in the tubular neck for ready adjustment or replacement as desired.

Figure 6:
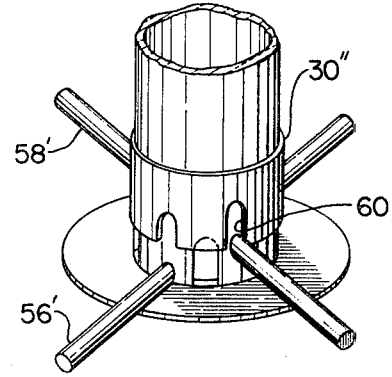

Referring now to FIG. 6 of the drawings, there is illustrated a further modification of the invention and in this embodiment a slidable collar 30'' is provided to regulate the flow of bird seed out through the tube ports onto the feeding tray. The collar 30' is provided with notches 60 to permit the collar to slide down over the cross perches 56' and 58'.

Figure 7:
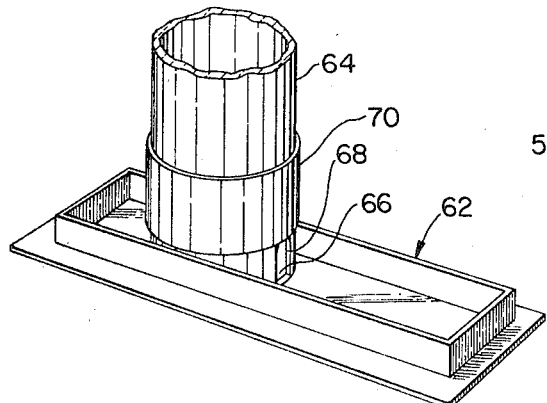

In the FIG. 7 embodiment, a combination tray and perch 62 is provided in rectangular configuration and mounted off-center to the lower end of a tubular neck 64. A wooden plug 66 forms the bottom wall of the tube and the perch 62 is rotatably mounted to the plug 66 as by a screw. The neck 64 is formed with but a single opening 68 so that the short side or the long side of the perch can be turned to collect seed coming through the opening, depending upon the size of birds to be attracted to the feeder. Again, a slidable collar 70 is provided to control the flow rate.

The bird feeder may be provided in the assembled manner illustrated or in a kit form for easy assembly, and the parts may be produced in plastic so as to be long-wearing and trouble-free. Several stations may be selectively adjusted so that one will attract one size of bird while another will attract a different size of bird and by using seed which is most attractive to a particular bird species, some control is possible over the species attracted to the feeder desired.

Having thus described the invention what I claim and desire to obtain by Letters Patent of the United States is:

1. A bird feeder, comprising
   a. a tubular housing having a funnel-shaped open upper portion adapted to contain a quantity of birdseed and a cylindrical lower neck portion,
   b. a cover pivotally mounted about a horizontal axis to the top of said housing, the axis of said cover being perpendicular to and intersecting the vertical centerline of said housing,
   c. a platform mounted to the bottom of said neck portion,
   d. said neck portion being formed with at least one port in proximity to said platform for discharging seed thereon, and,
   e. a sleeve fitted over said neck portion for axial adjustment therealong to selectively vary the size of said port.

2. A bird feeder according to claim 1 wherein said platform is adjustably connected to said housing.

3. A bird feeder according to claim 1 wherein said platform comprises a circular member formed with surrounding upright walls.

4. A bird feeder according to claim 3 including a spring-loaded rod extending along the vertical center line of said housing connected at its lower end to said circular member and a cross piece mounted along the cover axis and engaging the upper end of said rod, said circular member being formed with a slot to permit adjustment thereof.

5. A bird feeder according to claim 1 wherein at least the neck portion of said housing is transparent.

6. A bird feeder according to claim 1 including at least one elongated perch extending through the lower portion of said housing.

7. A bird feeder according to claim 3 wherein said circular member is formed with spaced openings and a screw passing through a selected one of these openings and engaging the lower end of said housing.

* * * * *